United States Patent [19]  
Levecque et al.

[11] 4,015,964  
[45] Apr. 5, 1977

[54] METHOD AND APPARATUS FOR MAKING FIBERS FROM THERMOPLASTIC MATERIALS

[75] Inventors: Marcel Levecque, Saint-Gratien; Jean A. Battigelli; Dominique Plantard, both of Rantigny, all of France

[73] Assignee: Saint-Gobain Industries, Neuilly-sur-Seine, France

[22] Filed: Mar. 11, 1975

[21] Appl. No.: 557,282

Related U.S. Application Data

[63] Continuation-in-part of Ser. No. 353,984, April 24, 1973, Pat. No. 3,885,940.

[30] Foreign Application Priority Data

Dec. 26, 1975 France .............................. 75.04970

[52] U.S. Cl. .......................................... 65/5; 65/16; 264/5; 264/12; 264/176 F; 425/7
[51] Int. Cl.² .......................................... C03B 37/04
[58] Field of Search .................... 65/2, 5–8, 65/14–16; 264/176 F, 5, 12; 425/7

[56] References Cited

UNITED STATES PATENTS

| | | | |
|---|---|---|---|
| 2,126,411 | 8/1938 | Powell | 65/5 |
| 2,315,735 | 4/1943 | Richardson | 65/83 |
| 2,515,738 | 7/1950 | Slayter et al. | 65/16 |
| 2,754,541 | 7/1956 | Stalego | 65/7 |
| 2,982,991 | 5/1961 | Karlovitz | 65/13 |
| 3,224,852 | 12/1965 | Stalego | 65/16 |
| 3,357,808 | 12/1967 | Eberle | 65/7 |
| 3,874,886 | 4/1975 | Levecque et al. | 65/5 |
| 3,885,940 | 5/1975 | Levecque et al. | 65/5 |

Primary Examiner—Robert L. Lindsay, Jr.  
Attorney, Agent, or Firm—John T. Synnestvedt

[57] ABSTRACT

Method and apparatus for the production of fibrous materials from attenuable substances, particularly molten glass, are disclosed, along with the fiber products which result. In the disclosed system the material to be fiberized flows into a region established as a result of the interaction of a jet transversely oriented with respect to a larger blast, the material being acted upon in the interaction zone to produce a highly attenuated fiber. The disclosed method and apparatus utilizes a glass admission orifice spaced above the blast.

18 Claims, 13 Drawing Figures

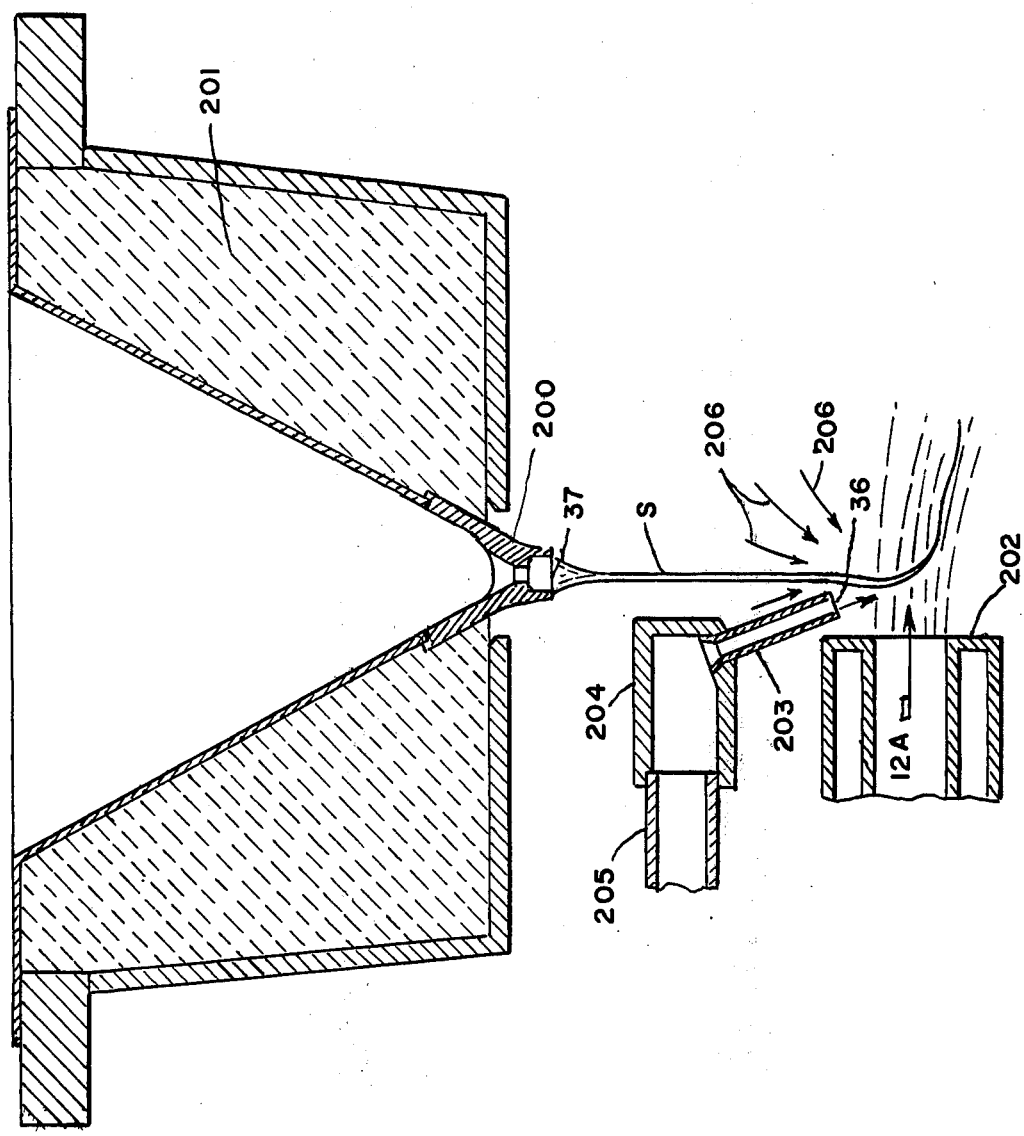

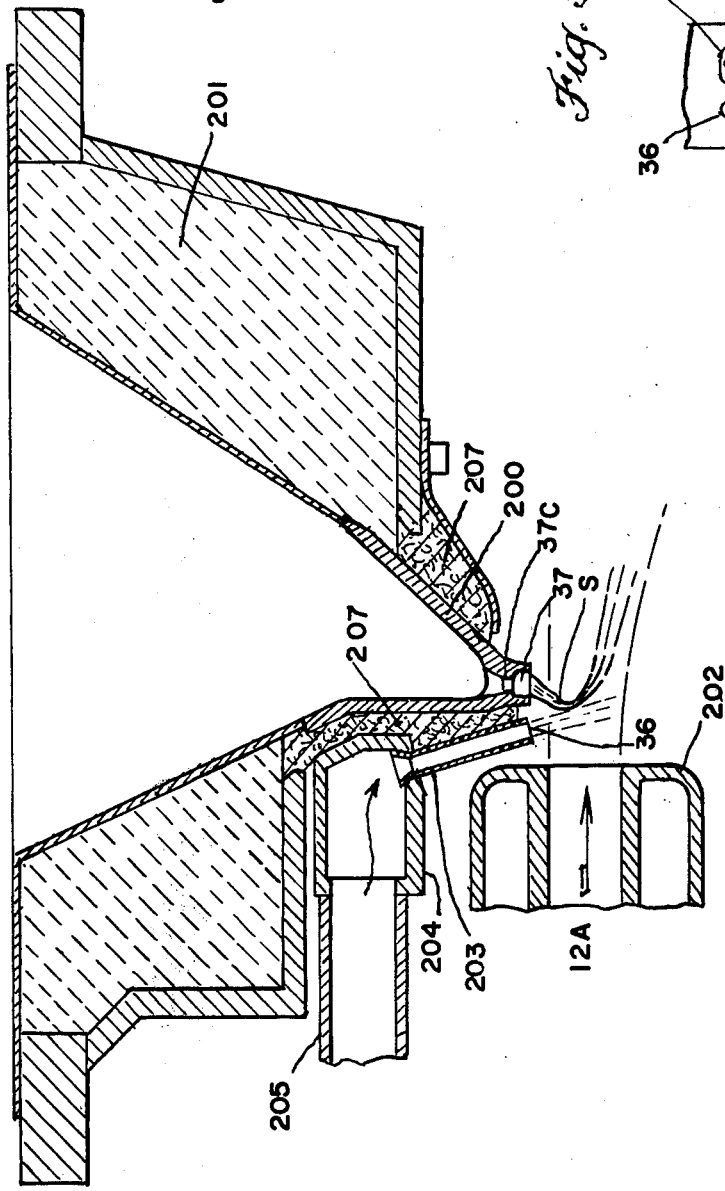
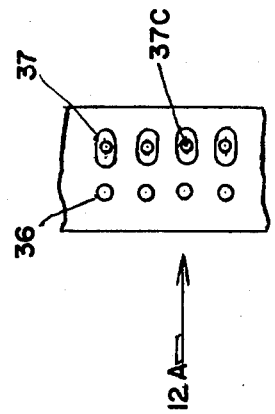

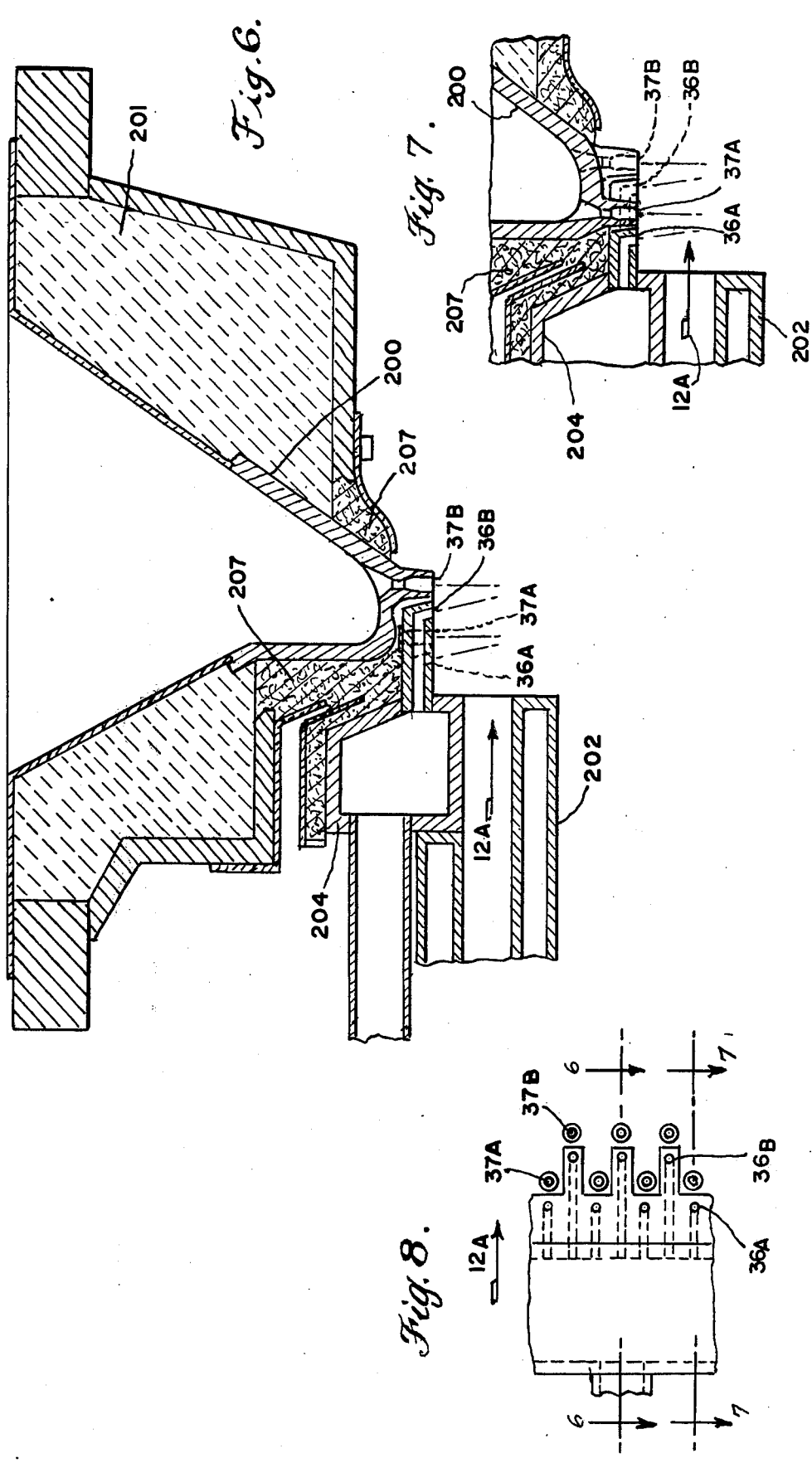

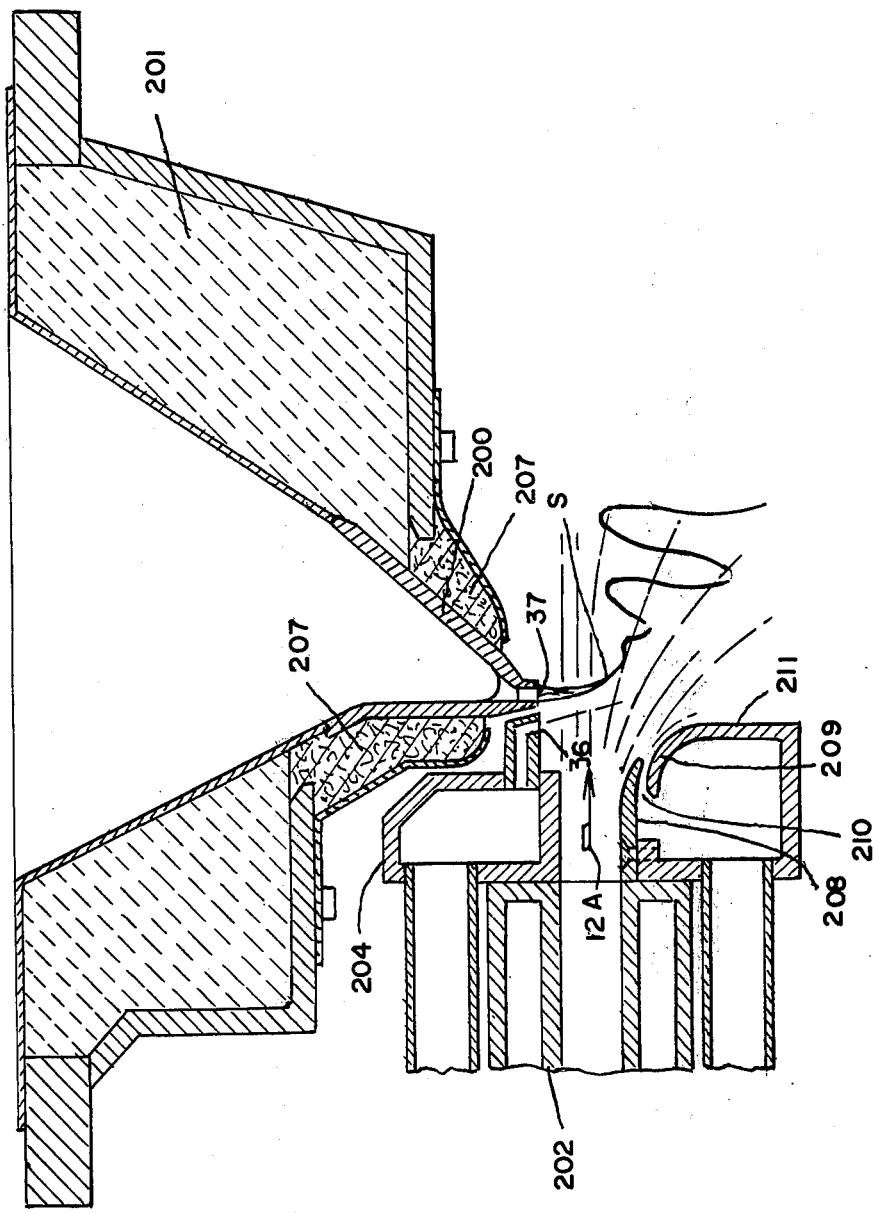

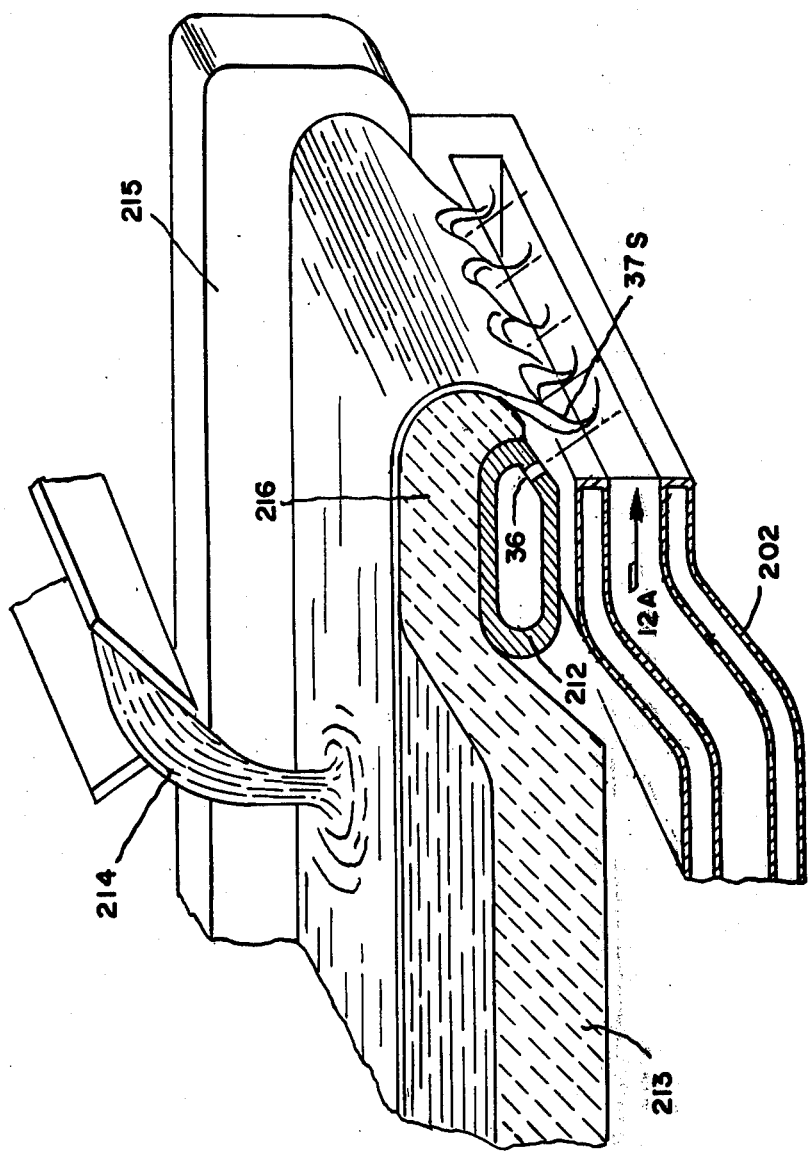

METHOD AND APPARATUS FOR MAKING FIBERS FROM THERMOPLASTIC MATERIALS

CROSS REFERENCES

The present invention application is a continuation-in-part of our prior application Ser. No. 353,984, filed Apr. 24, 1973, issued May 27, 1975 as U.S. Pat. No. 3,885,940. Attention is also called to the fact that said prior application and also the present application discloses certain subject matter is common with application Ser. No. 353,983, filed Apr. 24, 1973, by two of the present applicants, issued Apr. 1, 1975 ad U.S. Pat. No. 3,874,886. The omission of claims to any features herein disclosed is not to be understood as an abandonment of that subject matter, because such features are claimed in companion copending applications.

TABLE OF CONTENTS

In connection with the following listing of the headings and in connection with the text of the specification between the headings as inserted in the specification, it is to be understood that not all of the text which intervenes between successive headings is necessarily directly related to the subject of the preceding heading, because in many instances interrelated subjects are jointly considered or are considered in overlapping sequence.

ABSTRACT
CROSS REFERENCES
TABLE OF CONTENTS
INTRODUCTION
BACKGROUND
STATEMENT OF THE PRIOR ART
  1. Longitudinal Blowing
  2. Strand
  3. Aerocor
  4. Centrifuging
ANALYSIS OF THE PRIOR ART
OBJECTS AND ADVANTAGES
BRIEF DESCRIPTION OF DRAWINGS
BRIEF DESCRIPTION OF TORATION
FIG. 1
GENERAL STATEMENT OF VARIABLES
ANALYSIS OF TORATION—FIG. 2
JET INTERACTION ACTIVITY
ACTION ON GLASS
FIGS. 3–13

INTRODUCTION

The invention relates to fine fibers and to the production thereof from a substance in a condition in which it is capable of being attenuated, such substances being hereafter generally referred to as "attenuable materials", particularly attenuable materials which soften or liquefy upon entering a molten state as a result of the application of heat and which harden, or become relatively solid, upon cooling.

The process and equipment of the invention are especially suited to the formation of fibers from glass and the disclosure herein accordingly emphasizes glass fibers and their production.

BACKGROUND

There are four rather well-defined and recognized prior art techniques by which glass fibers can be made, these four techniques, which are mentioned at this point but discussed in more detail herebelow, being:

1. Longitudinal Blowing: Other terms sometimes used include "blown fiber", "steam blown wool", "steam blown bonded mat", "low pressure air blowing", or "lengthwise jets".
2. Strand: Other terms sometimes used are "continuous filament", or "textile fibers".
3. Aerocor: Another term sometimes used is "flame attenuation".
4. Centrifuging: Other terms sometimes used include "rotary process", "centrifugal process", "tel process", or "supertel process".

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques have not met with sufficient success to achieve a separate and recognizable status in the art.

The present application and the companion applications Ser. Nos. 353,983 and 353,984, above referred to are all concerned with a new, fifth technique which is unique in principle and practice, and which brings about unique results, and therefore is the starting point of a new art. Since the inventions of both the present and the companion applications are closely related, a full disclosure of the common subject matter of the present application and of the prior applications is included in the present application. Moreover, in the description of various embodiments of the common subject matter, unless otherwise indicated by statement or context, the references to "the invention" are not to be understood as limited to inventive subject matter of either the present application alone or of either of the companion applications alone.

Because the subject matter concerns a new technique, and also because a diligent search has failed to reveal any suitable existing English word which aptly applies to the new tecnique disclosed, we have coined the word "torate", a verb, and the word "toration", a noun, to refer to our new technique and product. The usage of these new words in the present specification will illuminate their meanings, but for present purposes it is pointed out that, by our new technique, glass can be "torated" into fibers, the jet and blast which cooperate to effect fiberization can be referred to as the "torating" current or blast, the fibers which result can be said to have been "torated", or to be "torated" fibers, and the process involved can be referred to as "toration".

STATEMENT OF THE PRIOR ART

Attention is now turned to a more detailed survey of the four prior art techniques briefly mentioned above.

1. Longitudinal Blowing

Longitudinal blowing is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

2. Strand

The strand glass fiber manufacturing process begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes.

3. Aerocor

In the aerocor process for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process, molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

ANALYSIS OF THE PRIOR ART

It has long been recognized that it is desirable to produce glass fibers exceedingly small in diameter, for example on the order of a few microns, because products made with such fine fibers have remarkable advantages, including strength, good thermal insulating capability and other physical properties. Further, while the length of the fiber is more or less significant according to the purpose for which the fiber is to be used, it is generally desirable that the fibers be long rather than short. Still further, it is highly advantageous, particularly from the standpoint of the economics of fiber production, that a high production rate be utilized in the manufacturing process employed. One way to reach a high production rate is to have a high orifice pull rate. By "orifice pull rate" we mean to denote the amount of production accomplished within a given time from a single fiber producing center. "A single fiber producing center" means one orifice emitting one glass stream in the longitudinal blowing process, the strand process, and the centrifuging process, and it means one rod of glass in the aerocor process. In toration it means one glass cone from which a single fiber is drawn. Pull rates for a given process are typically given in terms kilograms, or pounds, or tons, per hour, or per 24 hour period.

To summarize, it is generally desirable to make very fine fibers, very long fibers, and to make fibers at a high orifice pull rate, but these objectives conflict with each other, insofar as prior art processes are concerned. Therefore it has always been necessary that a selection be made to sacrifice one or more desiderata in order to obtain the others. Further, each of the prior art processes can effectively serve to make only one or a narrow range of products. For example, by the strand process very fine continuous fibers can be made, but the orifice pull rate is low and the resultant product is not economically useable in the form of glass wool. On the other hand, the centrifuging process makes fibers at a relatively higher orifice pull rate but they tend to be short and they are produced in the form of wool and cannot be readily organized to make roving or other reinforcing products or textiles. The wool resulting from the centrifuging process is very satisfactory in products such as building insulation in which considerable ranges of fiber diameters and lengths in the finished product are satisfactory; however, where the insulation and product strength requirements are very high, other techniques of manufacture, such as the aerocor process, are generally employed.

The aerocor process makes long the fine fibers, if orifice pull rates comparable to those of the centrifuging process are used. But the aerocor process cannot be operated at an orifice pull rate high enough to effectively compete with the centrifugal process. As the orifice pull rate in the aerocor process is progressively increased, there is a corresponding increase, unavoidably, in fiber diameter, until a certain diameter is reached and if the orifice pull rate is increased even further, the glass rod utilized in the process will tend to pass through the gaseous blast without being completely melted and this results in the inclusion in the product of an unacceptably high number of bent pieces of relatively coarse glass fiber, these bent pieces being known as "hooks".

In the above described first longitudinal blowing technique the fibers in the bonded mat are long and uniform in diameter, but the orifice pull rates are relatively low. An attempt to increase the orifice pull rates generates unfiberized material having the shape of insufficiently drawn glass drops.

It is the prime characteristic of the invention to obtain fine and long fibers at very high orifice pull rates.

In the second longitudinal blowing technique the orifice pull rates can be very high, but the attenuating blasts break the glass streams prior to attenuation with the result that a large portion, even up to 50%, of the glass is unfiberized and lodges in the wool product in the form of slugs; further, the fiber is very short and irregular in diameter.

It is an important characteristic of the invention to obtain the fine and long fibers at high pull rates, as discussed above, while at the same time producing fiber practically free of unfiberized material.

Many prior workers have made repeated efforts to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic fibers, or through the use of confining jets, or both.

The approach taken in the just mentioned prior art technique suggests that the realization of optimum fiberization lies in extending the length of the attenuating zone.

Contrary to such teachings, in the practice of the present invention, attenuation is accomplished in the course of a short path length, on the order of one to two centimeters. Therefore, as will be more readily apparent from the explanation of the subject invention which follows, it is an important characteristic of the invention that the fibers are removed, very early in the process, to a cool zone, in which no further attenuation is possible.

Various other approaches have been suggested for introducing glass in the molten state into an attenuating blast. In such attempts to introduce a stream of molten glass into an attenuating blast it has been noted that there often is a tendency of the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles, and the transfer of substantial kinetic energy to the glass stream as, for example, by certain modifications of the centrifuging process.

An alternate approach to the problem, more closely akin to the aerocor process, has been the introduction of the glass in the form of a solid or pre-softened glass rod or in the form of powdered glass.

In contrast, it is another important characteristic of the invention to introduce glass in the molten state, in a progressive and very stable way, into an attenuating zone where the attenuating parameters are the most efficacious.

OBJECTS AND ADVANTAGES

In contrast with all of the foregoing, it is a major objective of the present invention to provide a technique for producing glass fibers (as well as the resulting fibers themselves) in which it is not necessary to sacrifice any one of the major desiderata above referred to, namely, fineness of fiber, long fiber length and high pull rate.

Because of the accomplishment of the above major object, with the technique of the present invention it is possible to produce fibers adapted to a much wider range of uses than has been practicable with any one of the presently known techniques.

Another object of the invention is the provision of a technique for producing mineral fibers which is readily adaptable to adjustment of operating conditions so as to selectively produce fibers adapted to a wider variety of uses than has been practicable heretofore. The broad range of fiber types and characters capable of being produced by the technique of the present invention makes it unnecessary in many situations to rely upon more than one technique or process for various different products. In the glass fiber industry this presents outstanding advantages because of the capability of producing a wider range of products with a single technique, thereby eliminating substantial investment in capital equipment which would otherwise be required in order to produce the same range of products by presently known or conventional techniques.

The invention further has in view the provision of a technique for producing glass fibers in which various limitations of the prior art techniques are eliminated. For example, the technique of the present invention requires only static equipment, in contrast with the widely used centrifuge method in which the fiberizing equipment rotates at high speed, thus necessitating special high precision machinery and maintenance. Static equipment makes it possible to construct the equipment from materials which have very high strength at high temperatures in static conditions, without the need to have high temperature strength in dynamic conditions. This allows fiberizing a broader range of materials.

As another example of eliminating prior art limitations, the technique of the present invention greatly simplifies and facilitates the introduction of molten glass into the interior of a blast for purposes of attenuation, the means or system for accomplishing such introduction of the glass in the process of the invention being explained more fully hereinafter. This feature of the invention is in striking contrast to various of the prior art systems for introducing glass into an attenuation blast, such as the aerocor process above described, in which a solid glass rod is fed into the blast, to be softened and melted. As above pointed out this type of system is severely limited with respect to pull rate and has a tendency to develop "hooks." In contrast, the feed of the molten glass into the attenuating zone within the torating blast in the technique of the present invention makes possible much higher orifice pull rates than are possible with the aerocor process, and this is accomplished with the technique of the present invention with a negligible amount of unfiberized material and moreover, while maintaining fineness of fibers.

A still further object of the present invention is to provide a technique for making mineral fibers in which a wider variety of batch formulations may be utilized in the making of fibers, over a wide range of fiber properties or characteristics, than is possible with any one of the presently known processes.

The foregoing and other objects and advantages which are attained, including numerous specific advantages flowing from toration will be explained more fully hereinafter.

THE DRAWINGS

FIG. 3 is a vertical sectional view through a fiberizing center arranged according to the present invention and including means for generating a blast, means for generating a secondary jet, and a glass supply means including a glass supply orifice spaced substantially above the upper boundary of the blast.

FIG. 4 is a view similar to FIG. 3 but illustrating an alternative embodiment in which the crucible is differently shaped; and FIG. 5 is a diagram showing the glass admission orifices of the embodiment of FIG. 4 and further showing the arrangement thereof in relation to the secondary jet discharge orifices.

FIG. 6 is a vertical sectional view through an arrangement embodying multiple fiberizing stations and taken as indicated by the section line 6—6 on FIG. 8;

FIG. 7 is a partial view similar to FIG. 6 but taken as indicated by the section line 7—7 on FIG. 8; and FIG. 8 is a view of certain parts shown in FIGS. 6 and 7 but looking upwardly, and illustrating the plan pattern interrelation of the glass and jet orifices of this embodiment.

FIG. 9 is a view of still another embodiment, this arrangement being similar to FIG. 4, but further including a means for introducing an additional gas current at the side of the blast opposite to the glass and secondary jet orifices.

FIG. 10 is a somewhat diagrammatic outline isometric view illustrating an alternative system for providing separation between the glass admission means and the blast.

TORATION

The terms "toration," a noun, and "torate," a verb, as mentioned above and as used herein, constitute contractions of the words "tornado" and "attenuation" and are used to denote the action on an attenuable material in the zone of interaction created when a blast, or first jet, is penetrated by a transversely oriented second jet, the latter being completely encompassed or enveloped by the former. Clearly defined and forceful currents, including two counterrotating tornadoes, or whirls, or vortices, having substantial angular velocity, are generated by the interaction of the two jets, and these currents, by frictional licking or sweeping against the surface of the attenuable material, exert forces tending to induce the attenuable material to flow toward and into the zone of interaction; the material then is brought more and moe under the influence of the tornadoes and forms itself into an elongated cone from the tip of which a fine fiber is drawn by the combined flows of the jets. It is surprising that, although located in a whirling zone with very high velocities, the glass cone nevertheless is stable and that cross section reduces progressively from its base at the plane of emission to its tip, from which a single fiber starts. It is also very surprising that this fiber, although, at least part of the time, it has a nearly helicoidal movement at an increasing amplitude and velocity, continuously emanates from the cone in a continuous attenuation process.

The virtual lack of slugs in the fiber manufactured by toration is due to the dimensional and positional stability of the glass cone and to the continuity of the unique fiber attenuation.

The interaction phenomenon as described hereabove and which is of fundamental importance to the invention, can occur with a plate limiting one of the borders of the blast and through which the secondary jet is flowing, as in the parent application Ser. No. 353,984 and diagrammatically shown in FIG. 1. This same phenomenon can take place in embodiments described hereinafter, without any plate. The interaction phenomenon is essentially the same, whether or not there is a plate.

FIGURE 1

Figure 1:
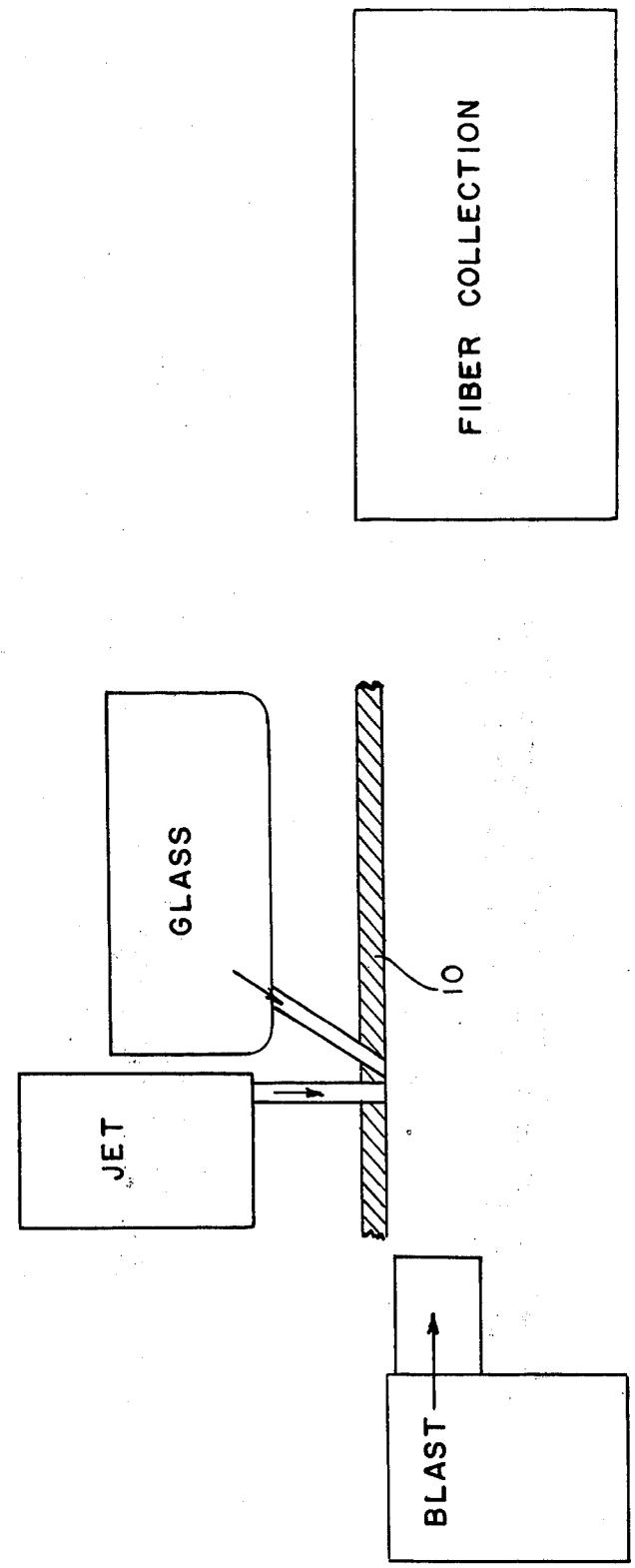
FIG. 1 is a diagrammatic representation of the major components of a fiberizing system according to the parent application Ser. No. 353,984, showing the general interrelation of the components for producing a blast and for producing a jet transverse to the blast, as well as the glass supply means and the fiber collection device.

Referring first to FIG. 1, a blast, or primary jet source, is indicated at the left, being arranged to deliver the blast along a surface, in this case the under-surface, of a plate or wall 10. The source of a secondary jet is also indicated, being arranged to deliver through the plate 10 so as to penetrate into the blast. The attenuable material, such as glass, is also delivered through the plate 10, and in the embodiment of FIG. 1 the point of delivery of the glass into the blast is just downstream of the point of delivery of the jet into the blast. An appropriate fiber collection means is indicated at the right in FIG. 1.

GENERAL STATEMENT OF VARIABLES

One possible way to control the quantity, quality, and size of the resulting fibers is by regulating the flow rate of the attenuable material. The regulation of the flow rate of attenuable material can be accomplished in a number of ways, e.g., by varying the temperature of the attenuable material so as to alter its viscosity characteristics. In the case of glass, generally speaking, the higher the temperature the lower the viscosity; further, when changes in the constituents of the glass are made so as to obtain different fiber quality, in view of its end use, such changes in the constituents of the glass can effect changes in the viscosity at a given temperature.

Other parameters which can be manipulated in order to control toration include the blast and jet fluid compositions, and the temperatures and the velocities of the blast and the jet. Typically, the interacting jets are composed of the same fluid, such as the products of combustion resulting from the burning of a suitable gaseous fuel, and in such circumstances the performance of toration, throughout a considerable temperature range, can be gauged in terms of the relative velocities of the primary and secondary jets. However, it must be kept in view that any substantial difference between the densities, or the viscosities, of the two jets can have a quite considerable impact on toration, and these additional factors can be accomodated in toration by taking account of the kinetic energies of the fluid streams, rather than just their velocities. The kinetic energy of a given volumetric unit of a fluid stream is directly proportional to the product obtained by multiplying its density by the square of its velocity.

In order to effect toration, the kinetic energy for the jet per unit of volume must be greater than that of the blast in the operational area thereof.

Additional control over the results obtainable by toration can be exercised by varying the orifices sizes, positions and configuration, particularly with respect to the secondary jet. Additional refinements to the basic apparatus are discussed below with respect to the various illustrated embodiments of the present invention.

ANALYSIS OF TORATION—FIG. 2

Figure 2:
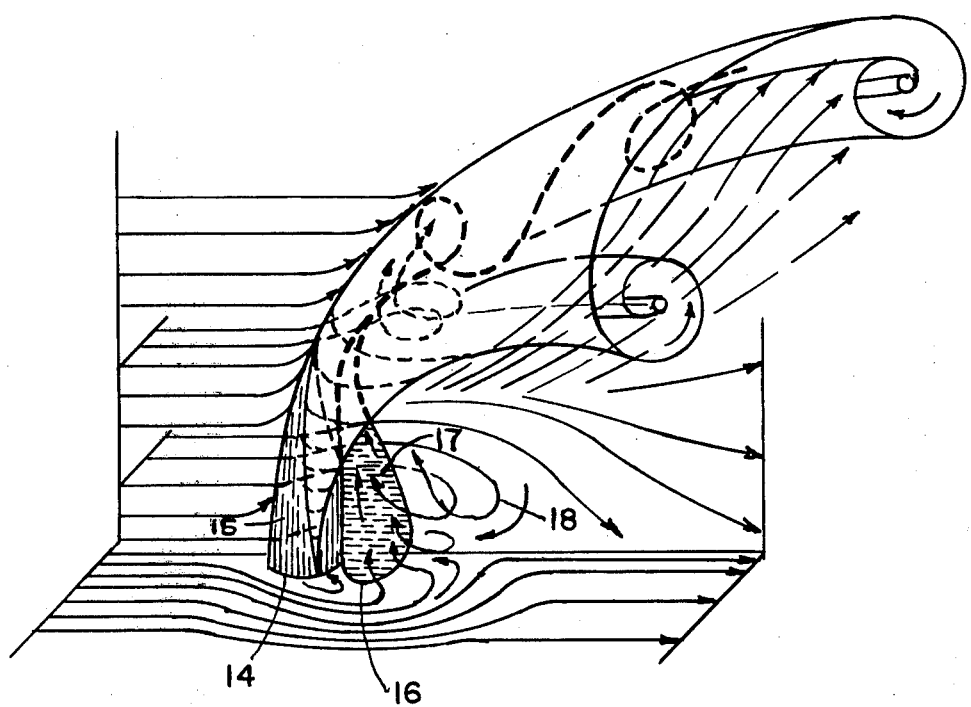
FIG. 2 is a diagrammatic perspective view, of the action at a fiberizing center according to said parent application and showing a pattern of flow of gases and glass which is typical of toration, this view being inverted as compared with FIG. 1, that is, showing the glass and jet flowing upwardly instead of downwardly.

In further explanation of the operative forces responsible for toration, reference is made to FIG. 2 which presents, in part, our actual observations and, in part, our theoretical suggestions and conclusions as to the zone of interaction created by intersecting jets and as to the resultant fluid flow which gives rise to the whirl or miniature tornado phenomena hereinbefore referred to as being of importance in toration. The FIG. 2 shows the same general arrangement of the components of a fiberizing center as in FIG. 1, but FIG. 2 shows the secondary jet in inverted position as compared to FIG. 1, that is the jet is directed upwardly instead of downwardly, and further FIG. 2 is on a very much enlarged scale as compared to the FIG. 1.

In the representation of toration as appearing in FIG. 2, the principal jet or blast travels from left to right. The secondary jet 15 is oriented substantially perpendicular to the principal jet and, in a sense, can be said to intercept it, with respect to a part of the blast. The relative relationship of the principal jet and the secondary jet is such that the secondary jet is completely enveloped by the principal jet. The significance of this operative relationship will become more readily apparent from the analysis of the complete process of toration which is presented herebelow.

Reference herein is repeatedly made to "upstream" and "downstream"; unless context clearly requires a different meaning, these terms have reference to the flow of the blast.

JET INTERACTION ACTIVITY

The blast splits and flows around the secondary jet while the secondary jet substantially maintains its thrust and its integrity, and can be said to pierce through the blast.

Since the secondary jet is unconfined (in the sense that it is not within a tube or other solid-walled flow passage), its flow at its periphery induces some fluid of that blast to flow along with it, that is, some fluid of the blast is carried along with the flow of the secondary jet. The interaction results in the generation of a region of relatively reduced pressure that is, negative pressure, immediately downstream of the secondary jet.

The split portions of the blast flow around the secondary jet toward the negative pressure region and thus rejoin each other to form strong recirculation currents shown in FIG. 2 by blast flow arrows 18 which curve right around on themselves, and also curve upwardly, and indicate flow having a component generally from right to left, countercurrent to the blast which, as above mentioned, is flowing generally from left to right.

The extent of the negative pressure region is a function of the ratio of the kinetic energies, per unit of volume, of the blast and jet. In the upstream-downstream sense the negative pressure region extends about 2 to 3 jet orifice diameters and in the lateral sense it extends about 1 to 2 jet orifice diameters.

The zone of interaction of the blast and the jet gives rise to the formation of two oppositely rotating tornadoes, or whirls, one on each side of the secondary jet slightly downstream of the midpoint thereof. As clearly shown in FIG. 2 these two tornadoes, or embryonic, vortices, swell substantially as they whirl upwardly and turn in a downstream direction.

Thus, the zone of interaction is characterized by the inception of the two oppositely rotating tornadoes and by a region of negative pressure immediately downstream of the base of the secondary jet, the negative pressure being quite pronounced in the region between the bases of the tornadoes and in the region immediately downstream thereof.

As the secondary jet loses its individuality, that is, its initial velocity and direction characteristics, it gives rise to a new flow, a mixture of the jet and blast which can be called a torating flow or torating blast.

The layers of the blast which are adjacent the jet and flow alongside it give the tornadoes their direction of rotation. As a result of this direction of rotation, a fluid particle placed on the outer layers of either tornado would be carried over toward the concavity of the above mentioned double volute, being caught by the two tornadoes like between two counter rotating calendar rollers.

While the outer layers of the tornadoes rotate at velocities which are identical to the velocities of the layers of the blast adjacent the tornadoes, the interior or central portion of each of the tornadoes turns around its own axis at very high speed. Thus, each tornado has an induction effect, in an inward and upward direction, on the adjacent portions of the blast which are flowing around the secondary jet. The induced flow is directed upwardly along and inwardly into the concavity constituting the deformed shape of the residual secondary jet flow and of the mixing layer.

It is surprising that, while the fluid flows at very high velocities in the central portion of each of the tornadoes, these tornadoes are nevertheless stable; their apexes appear to be affixed to the edge of the secondary jet orifice, slightly downstream of the axis thereof, and the gaseous envelopes of the tornadoes are practically immobile.

ACTION ON GLASS

The glass is either emitted directly into the low pressure zone immediately downstream of the secondary jet, or is drawn into this zone in situations in which it is supplied some distance from it. The flow of the glass into this region can be relied upon to take place clearly, even if the glass emission orifice in the plate 10 is not located immediately adjacent the downstream side of the secondary jet. This is so because the recirculation currents, discussed above, are quite pronounced and strong. Stated in another way, the glass localizes in the region of negative pressure just downstream of the secondary jet.

When viewed as in FIG. 2, the glass is drawn upwardly under the combined action of the gaseous currents and with the glass orifice 16 in a plate at the boundary of the blast, forms itself into a stable cone. Within the body of the glass, the glass travels out into the cone, especially by laminar flow, and continuously, uniformly and progressively decreases in cross section as it flows toward the apex of the cone. The steady diminution in cross section is important to the production of a fiber of substantially uniform diameter along its length and insures the continuity of fiberizing.

From inspection of FIG. 2 it can be seen that the diminution in cross section of the glass takes place during, and in phase with, the expansion in the cross section of the two tornadoes, the flow of the glass into the cone occurring within the concavity formed by the tornadoes and the downstream side of the secondary jet. Thus, the glass cone is protected or shielded from the disruptive impact which the blast would have upon it. A resultant is the stability of the flow of the glass which is an imporant characteristic of toration.

Next to the plate the tornadoes or whirls are of very small cross section and the frictional surface interaction thereof against the glass is of quite limited extent. At locations progressively farther and farther away from the plate, the tornadoes are progressively larger and larger and have progressively larger surface contact with the glass, the consequence being that the tornadoes have a progressively increasing influence on the glass attenuation.

What has been described thus far comprises a process for delivering attenuable material in a molten state at a steady reproducible rate, and in a stream of cross section which is continuously and progressively reducing, into a region in which it can be drawn out into a fine fiber. In other words, the description up to this point concerns the supplying of the glass, in a molten state, to a region of high velocity gaseous flow.

The final phase of the attenuating process, i.e., the drawing out of the attenuable material into very fine fibers, takes place within a short length of glass flow from the tip of the cone and extends for only about 3 to 5 jet secondary orifice diameters.

Toration is characterized by dramatically dynamic action. While we have witnessed the behavior of the glass by the naked eye and by means of high speed motion pictures, the experience undergone by the attenuable material occurs far too fast to be seen by the naked eye, and even too fast to be clearly captured by motion pictures. We have made extensive studies using motion pictures taken at 4,000, 6,500 and 10,000 frames per second and projected at speeds down to one frame per second. These studies have shown with certainty that from one cone tip there is only one single fiber drawn; but there remains an element of uncertainty as to the exact path of travel of this fiber.

What has been observed, particularly by means of the high speed motion pictures above mentioned, is a smooth continuously repititious, whipping action which appears to occur in a single plane but which more probably, because of the rotational nature of the whirling or vortical motion in the region of attenuation, actually follows a helical path, the pitch and the amplitude of which are increasing in the flow direction, for at least a substantial part of the time.

FIGS. 3 to 13

Before describing FIGS. 3 to 13 in detail the following should be noted by way of general comparison of the arrangements of these Figures with the arrangements shown in the parent application Ser. No. 353,984, as represented diagrammatically in FIGS. 1 and 2.

In the arrangements illustrated in FIGS. 1 and 2 described above, the glass admission orifice, is located at or substantially at a boundary of the principal jet or blast. In addition in all embodiments already described, the orifice through which the secondary or carrier jet is discharged is also located at or substantially at the same boundary of the principal jet or blast. However, for at least some purposes, it is advantageous and desirable to provide for some separation between the orifices and the boundary of the blast. For instance, such separation facilitates control of the atmosphere surrounding the crucible from which the glass is suppled, and such separation also makes possible employment of certain crucible heating arrangements which would not conveniently be accommodated in situations where the glass admission orifice is located at a boundary of the blast.

The arrangements of FIGS. 3 to 13 provide for separation of the glass admission orifice or glass admission means from the boundary of the blast. This may be accomplished by variations of apparatus and method as compared with the embodiments described above, and a number of the embodiments of the equipment shown in FIGS. 3 to 13 not only accomplished the foregoing general purpose of providing separation between the glass admission orifice and the boundary of the blast, but also afford other advantages, as is described hereinbelow.

In the following description of FIGS. 3 to 13, the principal jet or blast is indicated at 12A, and the secondary and glass orifices are respectively identified by the numbers 36 and 37.

Referring first to the arrangement shown in FIG. 3, a crucible is indicated at 200, being associated with some appropriate glass supply means such as a forehearth 201. The blast 12A is delivered from the structure 202 in a horizontal direction in a position spaced well below the glass crucible 200. The secondary jet orifice 36 constitutes the lower open end of the jet tube 203 which is supplied from the manifold 204 connected with a burner or other source of secondary jet gas by means of the duct 205. It will be noted that the jet tube 203 is positioned at an angle to the axis of the blast 12A and further that the jet orifice 36 is spaced above the upper boundary of the blast delivered from the structure 202. The jet interacts with the blast to produce a zone of interaction as described in detail above, said zone lying substantially vertically below the glass admission orifice 37. The glass is admitted in the form of a stream S descending by gravity from the orifice 37 and entering the zone of interaction of the jet with the blast, with consequent introduction into the fiberizing and attenuating zone in the manner already fully described.

In various of the arrangements disclosed in various of the figures of this application, including FIG. 3, the vertical spacing of the glass admission orifice 37 above the upper boundary of the blast 12A may be of the order of 10 to 100 mm. In addition, the vertical distance from the jet discharge orifice 36 and the upper boundary of the blast may be of the order of 5 to 10 mm.

In these arrangements, the intra-axial distance between the orifices 36 and 37 measured in the upstream-downstream direction of the blast 12A may be from about 4 to 10mm. Still further, because of the positioning and spacing of the various components making up the fiberizing center, it is desirable that the jet tube 203, and thus the jet discharged therefrom should be inclined with respect to the axis of the blast 12A. The angle of the jet with respect to the axis of the blast should be less than 90°, for instance from about 45° or 50° up to about 95°. A preferred range is from about 75° to about 85°. The relationships of spacing and angles should be such as to establish the zone of interaction of the jet with the blast at a point substantially vertically below the glass admission orifice 37. Preferably also the jet tube 203 and thus the jet orifice 36 should be located so that, considered in relation to the direction of flow of the blast 12A, the jet orifice is positioned upstream of the glass stream S, in view of which the inclination of the jet tube 203 results in discharge of a jet having motion generally transversely to the blast, but having a component in the downstream direction of the blast, thereby enhancing the fiberization and the movement of the attenuated fiber downstream of the blast.

Each fiberizing center provided in the manner described in connection with FIG. 3 functions in the general manner fully disclosed in the application for the principal patent above referred to, and the parameters including the kinetic energies of the blast and of the secondary jet in the operational area thereof and the temperatures and velocities of the blast and jet, as well as the temperature of the glass, and the relationship between the sizes of the glass and jet orifices may all generally conform with those parameters as set out in the parent application Ser. No. 353,984, although it is to be noted that in certain instances some of those parameters may be varied beyond the preferred ranges given. By way of example and as already pointed out, the embodiments of FIGS. 16 to 26 provide for substantial spacing of the glass admission orifice above the nearest boundary of the blast. Certain other variations may also be adopted, some of which are referred to just below.

With the arrangements of FIGS. 3 to 13, it is practicable to employ a somewhat wider range of ratios of kinetic energy of the secondary jet to the kinetic energy of the blast in the operational area thereof, as compared with the arrangements earlier described hereinabove. Thus, effective results are obtainable within a preferred range of jet to blast kinetic energies extending from about 4:1 to 35:1.

In the arrangements of FIGS. 3 to 13, the size of the jet orifice may be considerably smaller than that employed in the arrangements of the parent application. For instance, with arrangements of the kind shown in FIGS. 3 to 13, the jet orifice may be considerably smaller than the glass orifice, i.e. from about one-sixth of the size of the glass orifice up to about the same size, may vary from about 0.3 to 2.5 mm. Employing a smaller jet orifice requires concurrently employing a higher jet pressure with other operating conditions maintained at about the same values. Jet pressures running from about 2 bars up to about 25 bars may be used.

In arrangements of the kind disclosed in FIGS. 3 to 13, the intra-axial spacing of the jet and glass orifices measured in a direction upstream and downstream of the blast may be of the order of three to four times the diameter of the jet orifice, or from about 1 to about 10 mm.

The smaller secondary jet size is economically desirable because of a resultant saving of fuel consumption which would otherwise be needed.

In the operation of a fiberizing center as illustrated in FIG. 3 air currents are induced by the action of the jet delivered from the orifice 36 as indicated by the arrows 206, and these induced air currents influence the position of the glass stream S, tending to draw the stream toward the jet as the boundary of the blast is approached, and this action has a stabilizing tendency, i.e. it tends to assure uniform and stable entry of the glass stream into the zone of interaction of the jet and blast, with consequent uniform and stable introduction of the glass into the attenuation zone.

From FIG. 3 it will be observed that considerable space is provided between and around all of the major components of the fiberizing station, including the crucible, the manifold for supplying jet fluid to the secondary jet tube, and the equipment for generating and discharging the blast. Because of this increase in the spacing of the components at the fiberizing center, the heat transfer from the crucible to the blast and jet generators may more effectively be avoided. This in turn enhances the possibilities of controlling the glass temperature. The arrangement also permits using compositions which melt at much higher temperatures, or alternatively permits achieving higher glass throughputs.

It is to be understood that it is contemplated that the fiberizing centers be employed in multiple transversely of the blast.

The glass admission means used in an arrangement of the kind shown in FIG. 3 may either comprise a simple orifice, or may comprise an arrangement in which the orifice delivers the glass into and through a small passage enlargement or reservoir arranged just downstream of the orifice, as described more fully hereinafter with relation to FIGS. 4 and 5.

Turning now to FIGS. 4 and 5, it will be seen that the general arrangement of the major components is similar to that described above, although the vertical spacing of the glass admission orifice 37 above the upper boundary of the blast 12A is not as large as in FIG. 3.

In the embodiment of FIGS. 4 and 5 aluminum oxide fiber type of insulation (for instance 60% $Al_2O_3$) is applied to both sides of the crucible 200, as indicated at 207, thereby reducing heat loss from the crucible and serving also to protect the jet tubes 203 from the high temperature of the crucible. In order to withstand the temperature of the molten glass, the crucible, such as indicated at 200, is ordinarily formed of platinum and the insulation described just above aides in making possible the construction of other components, such as the jet tube 203 of less expensive metals, for instance stainless steel.

With provision for insulation such as shown at 207 between the crucible and the jet and jet supply components, it is also possible to maintain a larger temperature differential between the glass on the one hand and the gas fed through the jet on the other. In this way even where the secondary jet is of relatively low temperature, the insulation 207 makes possible maintaining a relatively high glass temperature without out excessive heat loss. This facilitates operating at a high production rate.

Attention is now called to the configuration of the glass admission passage as shown in FIGS. 4 and 5. Here it will be seen that the glass passage in the bottom of the crucible has a central calibrating or metering opening 37c and that the passage is enlarged both above and below the calibrating opening. The enlargement above the calibrating opening is funnel shape thereby assisting glass flow through the calibrating opening into the enlargement or storage pocket from which the glass stream is delivered. The lower enlargement serves in effect as a small reservoir from which the streamlet S is delivered. The perimeter of the delivery orifice 37 may be from two to three times that of the calibrating opening 37c, and the entire perimeter of this delivery pocket is wetted by the glass, in consequence of which better stability of the glass bulb or cone drawn from the orifice is provided, especially at high glass temperatures. Because of the delivery pocket, the base of the glass bulb or cone which is formed is of greater size and in turn results in a bulb of greater length, thereby providing greater spacing from the point of glass admission to the point of drawing the fiber from the bulb. This increase in the downward spacing of the point where the fiber is first formed reduces tendency for fibers to stick and accumulate on parts of the equipment in the vicinity of the fiberizing center.

Although the pocket which terminates in the glass delivery orifice may be circular, it is advantageous to employ a pocket enlargement of ovoid form having its major axis arranged in the upstream and downstream direction with respect to the flow of the blast 12A as is shown in the diagram of FIG. 5.

With a glass admission means of the kind described with reference to FIGS. 4 and 5, the metering orifice indicated at 37c constitutes the actual or controlling glass admission orifice.

In the embodiment of FIGS. 4 and 5 the pressure of the secondary jet may advantageously be somewhat higher than in the embodiments in application Ser. No. 353,984 above identified because of the separation of the jet orifice from the blast. Thus, secondary jet pressures from about 2 to 10 bars may be employed with an orifice diameter of about 2 mm, and with an orifice of about 1 mm the pressure may be from 2 to 25 bars.

The capability of using high pressures and high kinetic energy for the secondary jet tends to increase the flow of the glass delivered from the admission orifices and this improves the uniformity of the flow or drawing of the glass and improves the uniformity of the glass bulbs which are formed, which in turn improves the uniformity of the fibers being produced.

Still further the capability of using high pressures for the secondary jet, and the spacing of the jet and glass orifices 36 and 37 from the blast are factors which are instrumental in permitting the employment of larger intra-axial spacing between the jet and glass orifices. Moreover, these factors also facilitate the employment of glass orifices which are of larger size than those for the secondary jets, for instance from one to two times the size of the secondary jet orifice where jet pressures ranging up to about 12 bars are employed, and from two to three for jet pressures ranging from 12 to 25 bars.

In an arrangement as described above in connection with FIGS. 4 and 5, the width of the glass orifice pocket or enlargement, measured perpendicularly to the direction of flow of the blast 12A may, in a typical case be equal to 1.3 times the diameter of the secondary jet, and the long dimension of the orifice enlargement may be twice the width thereof.

With an arrangement as described above in connection with FIGS. 4 and 5, glass of the following formulation was used:

| | |
|---|---|
| SiO$_2$ | 63.00% |
| Fe$_2$O$_3$ | 0.30 |
| Al$_2$O$_3$ | 2.95 |
| CaO | 7.35 |
| MgO | 3.10 |
| Na$_2$O | 14.10 |
| K$_2$O | 0.80 |
| B$_2$O$_3$ | 5.90 |
| BaO | 2.50 |

The operation was carried out as indicated by the following table of parameters and results:

| | | |
|---|---|---|
| Glass output: | 35 to 40 Kg per day per glass orifice | |
| Micronaire | 4.0/5 grams | |
| Fiber diameter | 5 mm | |
| Blast 12A | - temperature | 1550° C |
| | pressure | 0.2 bar |
| | velocity | 450 m/s |
| Secondary jet | - temperature | 600° C |
| | pressure | 7 bars |
| | velocity | 560 m/s |

Ratio of Kinetic energies $\frac{\text{Secondary jet}}{\text{Blast 12A}} = 6$

Turning now to the arrangement shown in FIGS. 6, 7 and 8, there is again shown in an embodiment in which a crucible 200 is associated with a forehearth 201. A structure 202 is arranged to direct a blast 12A generally horizontally below the crucible.

In this case, the crucible is provided with two series or rows of glass supply orifices 37A and 37B, these being staggered as is shown in FIG. 8. The secondary jet supply manifold 204 is provided with projections having jet orifices 36B adjacent to the glass orifices 37B, and is also provided with additional jet supply structure having orifices 36A associated respectively with the glass orifices 37A. All of the orifices 36A, 36B, 37A and 37B are spaced above the upper boundary of the blast 12A and this arrangement thus not only has multiple staggered fiberizing centers, but also achieves this configuration while establishing vertical spacing between the orifices and the boundary of the blast.

In certain embodiments as described above, in which very high fiber outputs are obtainable, there are at times tendencies for fibers to penetrate through the blast 12A without being completely attenuated. This tends to produce premature solidification of portions of the fibers and also produces irregularities including thick fibers in the finished products. Tendencies of this type can be overcome by employment of an arrangement such as shown in FIG. 9.

In FIG. 9 the fiberizing equipment is arranged in the same general manner as in FIGS. 4 and 5 described above, but in addition, a wall or plate element 208 is positioned at the discharge mouth of the blast generator 202. This plate lies below the blast and is curved away from the axis of the blast. A continuation 209 of this wall structure is also provided and arranged with a slot 210 for delivery of a curtain or layer of air or other suitable gas supplied from the manifold 211.

In this operation the curved surfaces of the plate elements 208 and 209 introduce a Coanda effect which results in a broadening of the blast as is indicated by the flow lines in FIG. 9. This effect is of the same type as that provided by the arrangement shown in the embodiment of FIG. 11 of the parent application Ser. No. 353,984, but in addition the Coanda effect is accentuated by the delivery of a current of air through the slot 210. In consequence, the depth of the blast is increased in the hot area or zone where fiberization is occuring. This feature may be utilized to overcome tendency for the fibers to penetrate through the blast and to avoid premature cooling of the fibers before the desired attenuation has taken place. In a system such as represented in FIG. 9, the pressure of the blower delivering air through the slot 210 may be of the order of 3 to 6 bars.

Another adaptation of certain of the significant features of the arrangements having spacing between the point of glass admission and the blast is shown in FIG. 10. Here the blast generator is arranged below a jet manifold 212, the manifold having a series of orifices 36 each delivering a jet forwardly and downwardly therefrom to establish zones of interaction with the blast 12A.

In FIG. 10 the glass is supplied from a reservoir or pool in the receptacle 213 adapted to be replenished by the supply indicated at 214. The receptacle 213 has walls, one of which is indicated at 215, and also an overflow dam 216. A curtain or sheet of the molten glass flows over the dam and thence downwardly to the region of the jets delivered from the orifices 36 and by virtue of the action of those jets, as described above with particular reference to the embodiments of FIGS. 12, 12A, 13A and 13B of the parent application Ser. No. 353,984, the glass flow of the sheet divides into streams indicated at 37s. One such stream forms in a position adjacent to each of the jets and that stream enters the zone of interaction of that jet with the blast 12A, thereby resulting in fiberization.

This arrangement is of special advantage for certain purposes, including the fiberization of highly refractory or corrosive materials such as slags and certain other mineral compositions. Fiberizable materials of these types have a tendency to subject individual orifices to excessive wear, so that crucibles or other receptacles from which these materials are delivered through orifices would require repeated replacement, with consequent interruption of fiberization, as well as high equipment costs.

As in various other embodiments described herein, the distance between the jet orifices 36 and the closest boundary of the blast 12A may be of the order of 5 to 10 mm. The distance between the jet orifices 36 and the point on the dam 216 where the sheet of molten glass leaves the dam may be of the order of 2 to 10 mm.

Figure 11:
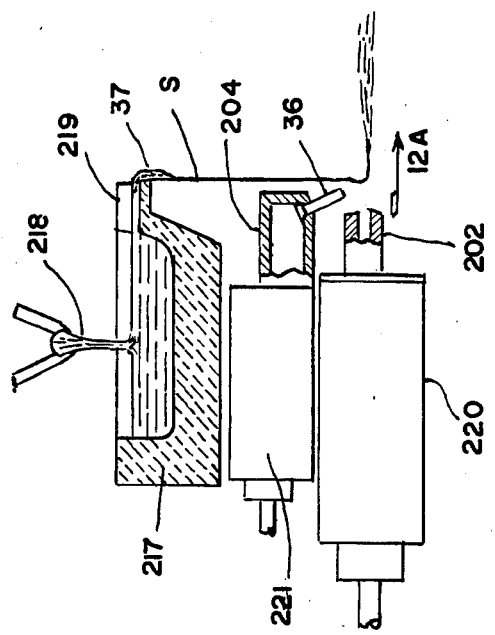
FIG. 11 is an outline diagrammatic view of a fiberizing center, with some parts shown in vertical section and some parts shown in elevation, and illustrating still another glass admission means providing for separation thereof from the blast.
Figure 12:
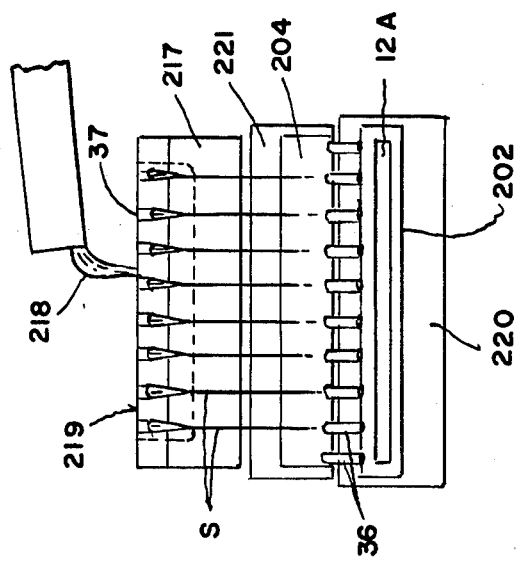
FIG. 12 is an elevational view of the arrangement shown in FIG. 11 taken from the right of FIG. 11.

In order to faciitate the handling of certain types of attenuable molten materials, particularly where the material tends to clog orifices in a bushing such as a platinum plate or tends to attack the platinum at high temperatures, certain arrangements may be employed providing for the use of highly inert or corrosion resistant materials, such as a refractory oxide, e.g. chromium oxide, alumina, etc. An arrangement suitable for these purposes is shown in FIGS. 11 and 12. Here a crucible 217 formed of a refractory oxide material is employed. It is supplied by a stream of the molten attenuable material is indicated at 218. One wall of this crucible if formed in the manner of a notched weir 219 providing individual supply troughs 37 for individual streams S of the material.

The blast generator 220 delivers the blast through the discharge nozzle 202 in a position well below the notched weir plate 219. A plurality of tubes having discharge orifices 36 are supplied from the manifold 204 in the manner described above with reference to other figures, a jet gas generator 221 serving to develop the gas for the jets. As in other embodiments described above, for instance the embodiments of FIGS. 3, 4 and 5, the jet orifices 36 are positioned to provide zones of interaction with the blast 12A at points which are located vertically below the descending streams S of the attenuable material, so that the streams enter the zones of interaction and are thereby fiberized.

In an arrangement such as shown in FIGS. 11 and 12, the notches of the weir plate 219 may be spaced substantially above the upper boundary of the blast, for instance from 5 to 10 cm, and preferably the jet orifices 36 are located from about 5 to 10 mm above the boundary of the blast. In the handling of certain attenuable materials which are prepared at very high temperatures and are delivered to the crucible 217 at such high temperatures, some cooling may be desirable in order to bring the material to the optimum fiberizing temperature. The spacing of the weir plate above the blast may in itself provide adequate cooling of the streams S of the molten material, but, if desired some additional cooling may be resorted to, for instance by reducing the temperature of the gases used for the secondary jets and for blast. Such gases may comprise either combustion gases (which may be cooled upstream of the delivery point) or compressed air or steam.

Figure 13:
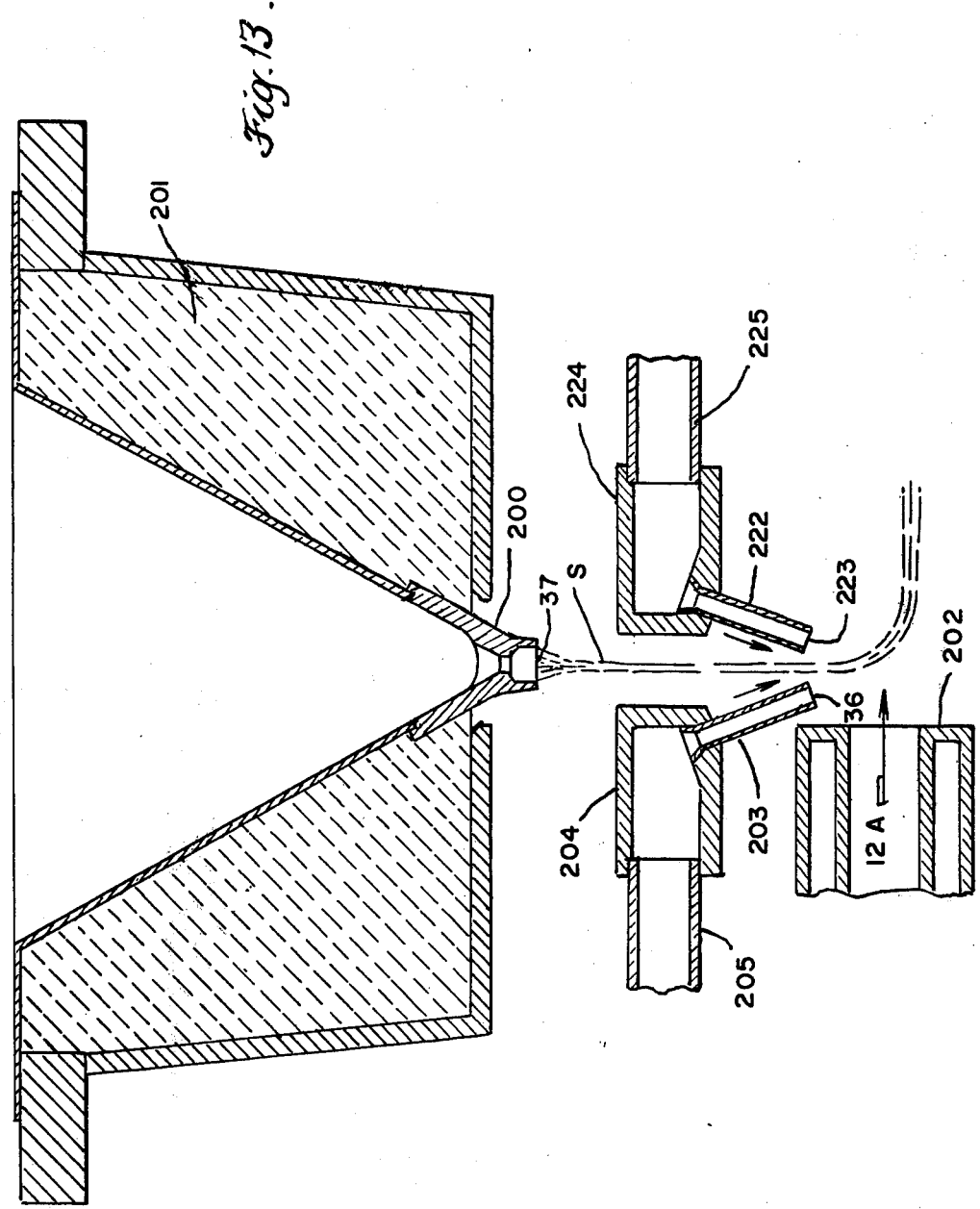
FIG. 13 is a view similar to FIG. 3 but illustrating the use of still another gaseous jet for purposes to be described.

FIG. 13 illustrates still another feature which may be employed in various of the arrangements decribed above in connection with FIGS. 3 to 12 inclusive. The fiberizing center represented in FIG. 13 is closely similar to that shown in FIG. 3 in most respects, but in FIG. 13 still another jet is provided. Here a jet tube 222 having an orifice 223 is arranged in a position, which, with respect to the direction of flow of the blast, is downstream of the glass supply stream S. Such a jet tube 222 may be provided at each fiberizing center, and these tubes may be supplied with jet fluid by means of the manifold 224 supplied from any suitable source by means of the connection 225.

Supplemental downstream jet tubes 222 may be used, particularly where the free-fall distance of the streams S is relatively great, the supplemental jets serving to assist in stabilizing the stream as they approack the zones of interaction between the secondary jets delivered from the orifices 36 and the blast 12A.

With a supplemental downstream jet of about the same size as the secondary jet and of about the same pressure and velocity, both the secondary jet and the supplemental jet will set up induced currents, as indicated by the arrows in FIG. 13, which currents will be more or less symmetrically disposed with relation to the stream S, thereby tending to maintain the stream in a substantially uniform position between the jets and thus with respect to the point of entry into the zone of interaction above described.

In all of the embodiments illustrated in FIGS. 3 to 13 and described above, the secondary jet orifice 36 is loated, with respect to the direction of flow of the blast, in a position upstream of the glass admission means. Although this is the preferred location for the secondary jet orifice in each fiberizing station, it is also possible to locate the secondary jet orifice in other positions with respect to the glass admission means or with respect to the stream of glass to be fiberized. Thus, the jet orifice may even be located, with respect to the direction of flow of the blast, in a position downstream of the glass admission means or of the glass stream to be fiberized, in which event the glass stream, for reasons pointed out in parent application Ser. No. 353,984 in connection with FIGS. 6 and 7, will follow a path at the surface of the blast around the jet to the zone of interaction of the jet with the blast just downstream of the jet and then will be carried into the interior of the blast in that zone, with resultant fiberization.

We claim:
1. A process for making fibres comprising establishing feed of a stream of attenuable material from a delivery means, establishing a gaseous blast directed in a path transverse to said stream in spaced relation to the delivery means so that said stream approaches the blast toward one side thereof, and establishing a gaseous jet of smaller cross section than that of the blast, the jet being directed toward the blast at the same side thereof as said stream, the jet having greater kinetic energy than the blast and penetrating the blast to establish a zone of interaction of the jet and the blast, and the stream of attenuable material being directed in a path independent of the path of the jet and positioned to meet the blast at a point adjacent said zone of interaction.

2. A process as defined in claim 1 in which the attenuable material is a thermoplastic material and in which the delivery means delivers the material at high temperature and in which the space between the delivery means for the attenuable material and the blast is a free space providing thermal insulation of the stream delivery means with respect to adjacent structure.

3. A process as defined in claim 1, wherein the stream of attenuable material is gravity fed downwardly to the zone of interaction.

4. A process according to claim 1, wherein the stream of attenuable material is located in a position which, when considered with relation to the direction of flow of the blast, is downstream of the jet.

5. A process according to claim 1, wherein the attenuable material is caused to flow in the form of a layer, a plurality of jets being used each establishing a zone of interaction with the blast, the jets being directed toward the blast in positions near the layer of attenuable material, so that air induced by the jets divides the layer into streams which are delivered into the interaction zones in the blast.

6. A process according to claim 1, wherein the attenuable material is fed over a notched overflow which delivers a plurality of streams directed toward the blast, a plurality of jets being used, each of which develops a zone of interaction with the blast adjacent to one of the streams of attenuable material.

7. A process according to claim 1, wherein the angle of the jet in relation to the blast is less than 90° but at least about 50°, which angle is included between the axes of the carrier jet and the blast.

8. Apparatus for making fibres comprising delivery means for establishing feed of a stream of attenuable material, means for establishing a gaseous blast directed in a path transverse to said stream in spaced relation to the delivery means so that said stream approaches the blast toward one side thereof, and means for establishing a gaseous jet of smaller cross section than that of the blast, the means for establishing the jet being positioned to direct the jet toward the blast at the same side thereof as said stream and to penetrate the blast and establish a zone of interaction of the jet and blast, the means for establishing the stream of attenuable material being positioned to direct said stream in a path extended to the blast independently of the path of the jet and to meet the blast at a point adjacent to said zone of interaction.

9. Apparatus as defined in claim 8 in which the delivery means is spaced above the blast and in which the attenuable material is gravity fed downwardly to the blast.

10. Apparatus according to calim 8 and further including a wall positioned to guide the blast, the wall being convexly curved at the side of the blast opposite to the delivery means for the attenuable material, and means for introducing an additional gaseous jet through said convexly curved surface.

11. Apparatus for making fibres comprising means for establishing a gaseous blast, a plurality of fiberizing centers associated with said blast including means for supplying attenuable material to the region of the boundary of the blast and each fiberizing center further including means for directing a gaseous jet of smaller cross section but greater kinetic energy than the blast to penetrate the blast transversely thereof, the supply means comprising a supply reservoir and means providing for overflow from the reservoir adjacent to a plurality of jets, thereby supplying the material to be fiberized at a plurality of the fiberizing centers.

12. Apparatus as defined in claim 1 in which the means providing for overflow comprises a dam providing for overflow of a layer of the attenuable material.

13. Apparatus as defined in claim 11 in which the means providing for overflow comprises a weir having a plurality of overflow notches respectively delivering streams of attenuable material to positions adjacent to the respective jets.

14. Apparatus for the production of glass fibres comprising means for creating a gaseous blast directed generally horizontally; a reservoir for supply of molten glass with a plurality of supply orifices for the glass spaced above the blast for delivering streams of molten glass to the blast, the orifices forming two sets, the individual orifices of each set being separated in an upstream-downstream direction relative to the blast; and means for propagating a plurality of gaseous jets each smaller than the blast and directed downwards and penetrating into the blast, each jet being located respectively so that it penetrates into the blast at a point where a stream of glass enters the blast.

15. Apparatus according to claim 14, wherein the means for propagating the jets includes a set of orifices for delivering the jets, each orifice being spaced above the upper boundary of the blast at a point which, in relation to the direction of flow of the blast, is upstream of a stream of glass, each jet orifice having its outlet axis inclined toward the stream of glass at an angle such that the jet penetrates the upper boundary at a point where a stream of glass encounters the upper boundary.

16. Apparatus for the production of glass fibres comprising means for creating a gaseous blast directed generally horizontally; a reservoir for supply of molten glass with a plurality of supply orifices for the glass spaced above the blast for delivering streams of molten glass to the blast, and means for propagating a plurality of gaseous jets each smaller than the blast and directed downwards and penetrating into the blast, each jet being located respectively so that it follows a path independently of the paths of the streams of glass but so that is penetrates into the blast at a point where a stream of glass enters the blast.

17. Apparatus for the production of thermoplastic fibres, comprising means for creating a main gaseous current directed generally horizontally; a supply orifice for molten thermoplastic material spaced above the main current, so that a stream of molten material flows by gravity in a path to the upper boundary of the main current; and means for propagating a carrier jet which is smaller than the blast and which is directed in a path independent of the path of said stream downwards to and penentrating into the blast in the vicinity of the point where the stream of molten material enters the blast.

18. Equipment for making fibres from attenuable material comprising supply means for the attenuable material having a delivery orifice positioned for delivery of a stream of attenuable material in a downwardly directed path, means for establishing a gaseous blast spaced below said orifice and directed transverse to the stream of attenuable material, means for establishing a first gaseous jet of smaller cross section than that of the blast directed in a path independent of the path of said stream and at an oblique angle downwardly toward and penetrating the blast and thereby establish a zone of interaction between the blast and the jet, and means for establishing a second gaseous jet positioned in a path independent of the path of said stream and of the path of said first jet and in a position with respect to said stream at the side thereof opposite to said first jet and having its axis intersecting the blast in the region of the zone of interaction, the delivery orifice for the attenuable material being positoned vertically above said zone of interaction to deliver the attenuable material into said zone without direct contact with said jets but in the influence of air currents induced at the adjacent sides of the jets.

* * * * *

UNITED STATES PATENT AND TRADEMARK OFFICE
CERTIFICATE OF CORRECTION

PATENT NO. : 4,015,964
DATED : April 5, 1977
INVENTOR(S) : Marcel Levecque, Jean A. Battigelli & D. Plantard It is certified that error appears in the above-identified patent and that said Letters Patent are hereby corrected as shown below:

Col. 1, line 6, delete "invention";

Col. 1, line 11, change "is" to read --in--;

Col. 12, line 58, "95°" should read --85°--;

Col. 16, in the table at the top of the column, revise the parameters given for "Secondary jet" to read as follows:

| Secondary jet | - temperature | 600°C |
|---|---|---|
| | pressure | 7 bars |
| | velocity | 560 m/s |
| | orifice diameter | 2 mm |

Signed and Sealed this sixteenth Day of August 1977

[SEAL]

Attest:

RUTH C. MASON
*Attesting Officer*

C. MARSHALL DANN
*Commissioner of Patents and Trademarks*